Feb. 13, 1923.
C. A. HOLT, JR
1,445,215
DUMPING BODY FOR VEHICLES
Filed Mar. 24, 1920   3 sheets-sheet 1
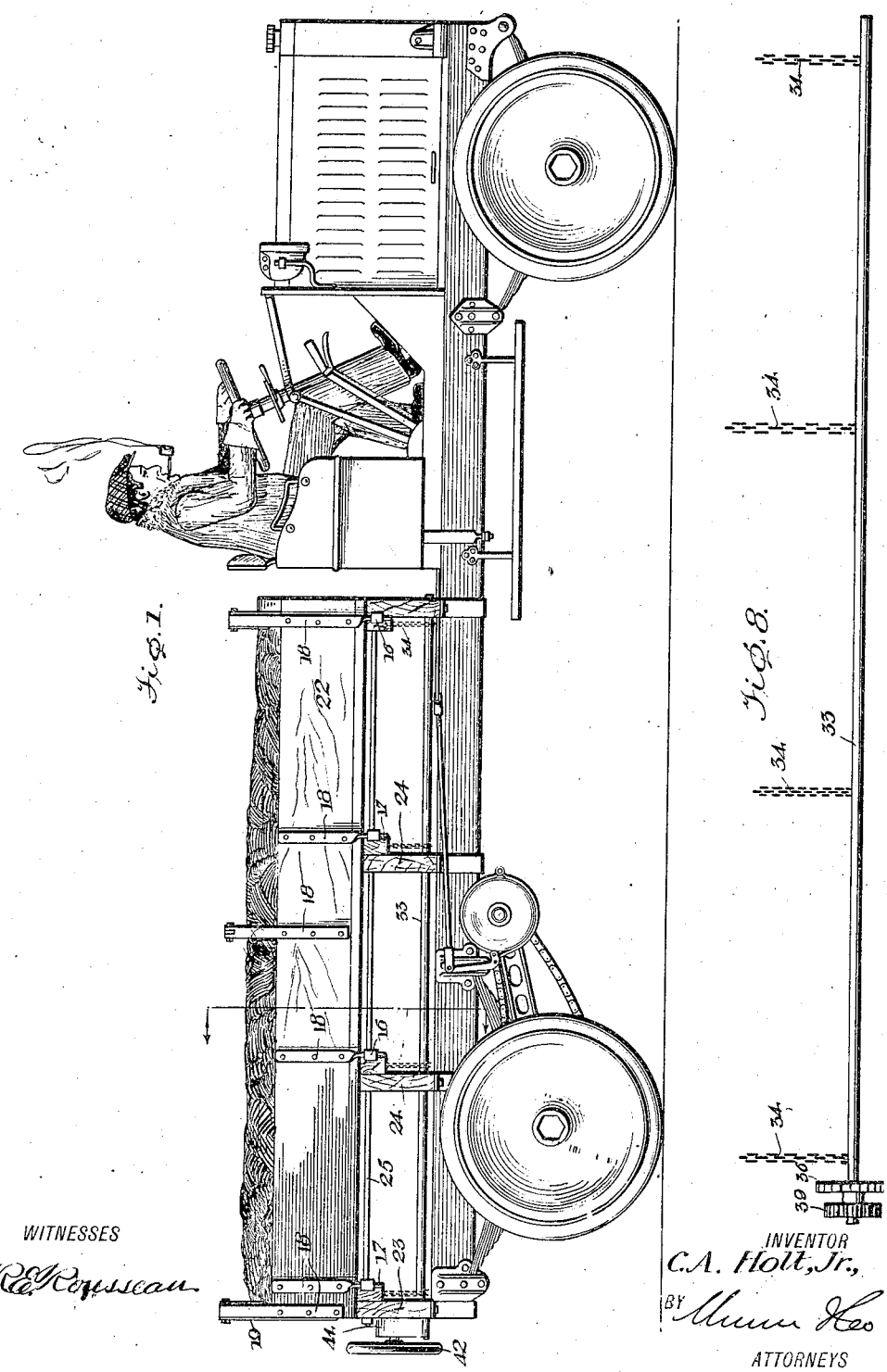
WITNESSES
INVENTOR
C.A. Holt, Jr.,
BY
ATTORNEYS

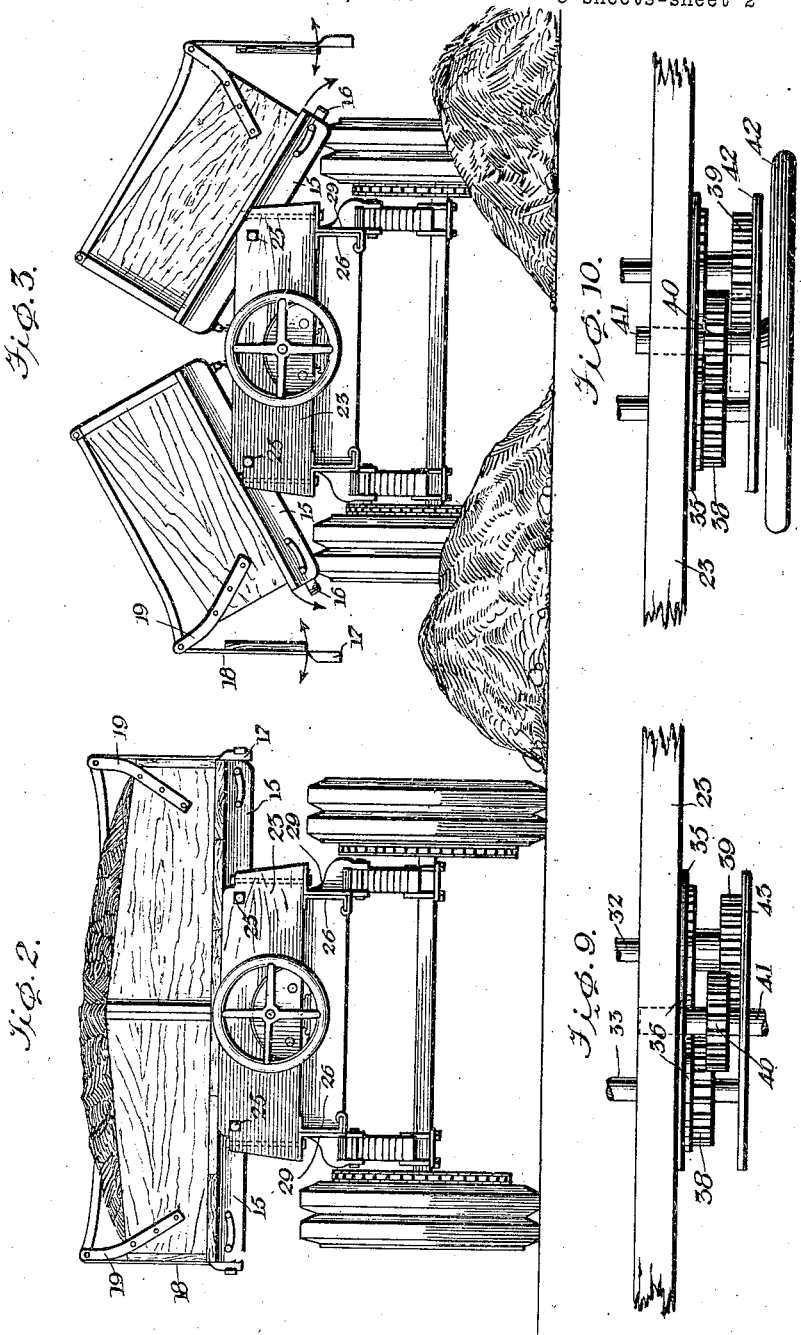

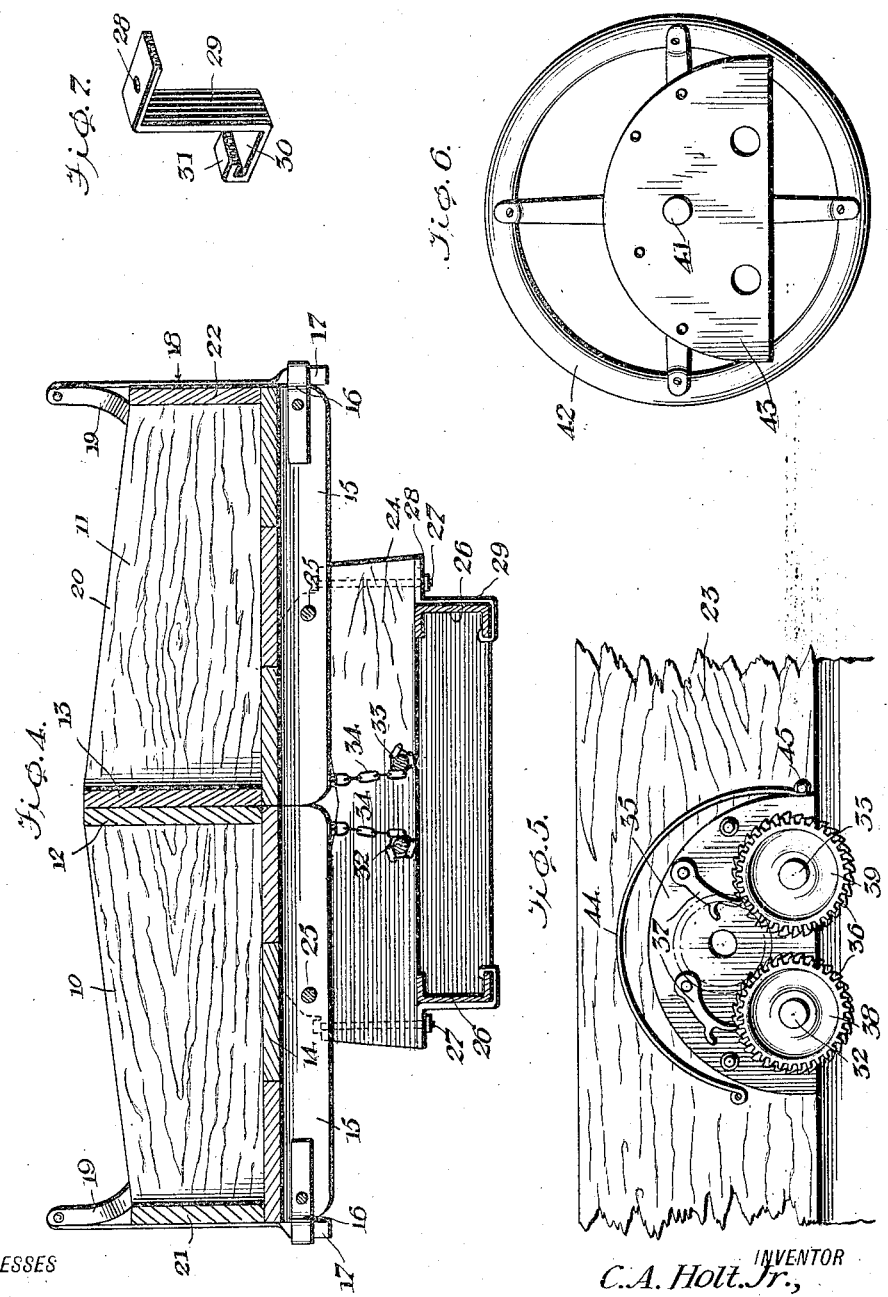

Patented Feb. 13, 1923.

1,445,215

UNITED STATES PATENT OFFICE.

CHARLES ABERCROMBIE HOLT, JR., OF GALVESTON, TEXAS.

DUMPING BODY FOR VEHICLES.

Application filed March 24, 1920. Serial No. 368,470.

*To all whom it may concern:*

Be it known that I, CHARLES ABERCROMBIE HOLT, Jr., a citizen of the United States, and a resident of Galveston, in the county of Galveston and State of Texas, have invented certain new and useful Improvements in Dumping Bodies for Vehicles, of which the following is a specification.

My present invention relates generally to dumping bodies, and more particularly to a side dumping body, my object being the provision of an improved side dumping body for automobile trucks and all other vehicles which will enable the carrying and separate dumping of two different materials, or the ready and convenient carrying and simultaneous dumping of the same material.

In carrying out my invention I provide a pair of lengthwise parallel and sidewise abutting bodies together with effective means for their support and control in such a way that they may be either simultaneously or independently dumped, and these objects and the advantages resulting therefrom will be apparent from the following description in which reference is made to the accompanying drawings, forming a part of this specification and wherein, Figure 1 is a side view illustrating the practical application of my invention, Figure 2 is a rear elevation with the two body sections in normal position, Figure 3 is a similar view with the body sections in dumping position, Figure 4 is an enlarged vertical transverse section taken through the parts proposed by my invention, Figure 5 is an enlarged rear elevation of the gear box with its cover and the actuating shaft removed.

Figure 6 is an elevation of the gear box cover removed together with the actuating shaft and wheel, Figure 7 is a detail perspective view of one of the bolster attaching brackets, Figure 8 is a side view of one of the control shafts, and Figures 9 and 10 are detail plan views of the control shaft actuating gears, with the actuating gear in different positions.

Referring now to these figures my invention proposes a dumping body for automobile trucks or other vehicles consisting of two lengthwise parallel and sidewise abutting body sections 10 and 11, having inner stationary side walls 12 and 13 which come together when the body sections are in normal horizontally alined position as seen particularly in Figures 2 and 4.

Each of these body sections has its bottom 14 secured upon transverse beams 15, the outer ends of these beams being provided with suitable engaging means as at 16 for the lower twisted ends 17 of hangers or straps 18 certain of which straps have their upper ends pivotally connected to the upper outer ends of brackets 19 secured to the end walls 20. To these hangers or straps 18 are secured the outer side walls 21 and 22 of the body sections 10 and 11, normally held in effective position seen in Figure 4 by the releasable engagement of the lower ends of the hangers whereby the outer side walls may be permitted to swing outwardly when the body sections are tilted outwardly and downwardly as seen in Figure 3.

For the support of the body thus far described I propose end bolsters 23 and intermediate bolsters 24 respectively seen in Figures 2 and 4, the end bolsters 23 and the intermediate bolsters 24 supporting the lengthwise fulcrum bars 25 which extend through the transverse beams 15 of the body sections and thus permitting the latter to swing under control of certain means to be presently described.

The top of the intermediate bolsters 24 are on the same plane and elevation as end bolsters 23, so that the bottoms 14 will rest directly on the bolsters 23 and 24 in the normal position shown in Figure 4.

The several bolsters 23 and 24 may be positioned transversely of the side bars 26 of the frame or chassis of an automobile truck, so as to extend at their ends slightly beyond the side bars 26. The opposite ends of the bolsters have vertical bolts 27 which depend through the apertured upper angular extensions 28 of brackets 29 whose lower ends have oppositely projecting apertured extensions 30 to project beneath the frame side bars 26, and terminating in reverting lips 31 adapted for engagement with the lower flanges of the frame side bars as seen particularly in Figure 4.

Through the several bolsters 23 and 24, and spaced upon opposite sides of the centers thereof, are a pair of parallel longitudinal control shafts 32 and 33, each having a series of chains 34 attached at one end thereto and at their opposite ends to the inner ends of certain of the transverse beams 15 of the body sections so that when the shafts 32 and 33 are rotated to wind the lower portions of the chains 34 thereon, the inner portions of the body sections 10 and 11 will obviously be drawn downwardly and the body sections thus shift from the outwardly and downwardly inclined positions of Figure 3 to the normal horizontal position of Figure 4.

The rear ends of the shafts 32 and 33 pass into and through a gear box whose inner side wall 35 is secured to the rear bolster 23 as seen particularly in Figure 5, and adjacent to this inner side plate 35, the shafts 32 and 33 are provided with ratchet wheels 36, each engaged by a pivoted pawl 37 which thus prevents rotation of the respective shaft in one direction and serves to hold the body sections 10 and 11 in the horizontal position of Figure 4.

Shafts 32 and 33 are also provided with gears 38 and 39 located at differently spaced points with respect to the bolster 23 so as to provide for their independent engagement if desired by a gear 40 secured on a lengthwise shiftable actuating shaft 41. This latter shaft 41 has a hand wheel 42 at its rear end and is mounted to slide through an opening in the inner side plate 35 of the gear box and a similar opening in the outer side plate 43 of the gear box, the latter of which includes a curved wall 44 pivoted at one side upon a stud 45 connecting the inner and outer side plates so that it may be readily shifted on this bolt as a hinge in order that the pawls 37 may be released.

It is thus obvious in operation that in order to dump the load, the pawls 37 are lifted free, if the body sections 10 and 11 are to be dumped at the same time, the gear 40 being shifted into engagement with both of the control shaft gears 38 and 39 as seen in Figure 9, so that the body sections are thus permitted to swing outwardly and downwardly to the dumping position of Figure 3 under control of the operator's grasp upon the actuating wheel 42. If but a single body section is to be lowered, the respective pawl 37 only is lifted, and the actuating shaft is moved to engage its gear 40 with the respective control shaft gear 38 or 39.

After dumping, the two pawls are simply left in engagement with the ratchet wheels and the actuating shaft shifted to engage its gear 41 with either of the gears 38, 39 independent of the other or shifted to lap and engage with both as in Figure 9, the hand wheel 42 being turned by hand so as to rotate the control shafts 32 and 33 and wind the chains 34 thereon.

It is obvious from the foregoing that my invention provides a convenient, strong and durable apparatus which may be readily applied to automobile trucks or other vehicles and which is capable of simple, convenient manipulation and operation.

I claim:

1. In a dumping arrangement, the combination with a wheeled frame having parallel side bars, brackets having inturned angular lower ends engaging the said side bars and having out turned upper ends projecting away from the side bars, bolsters disposed transversely of and across the said side bars, vertical bolts rigidly securing said bolsters at their ends to the said outturned upper portions of the brackets, a dumping body pivotally supported in connection with the said bolsters, and means for controlling movement of said dumping body including means for normally holding the same in horizontal position.

2. In a dumping body, the combination of a wheeled frame including parallel side bars, bolsters extending across the said side bars, brackets at the outer sides of the side bars having their lower portions engaged with the side bars and having their upper portions rigidly connected to the said bolsters, a dumping body including parallel abutting side sections, lengthwise parallel shafts supported by the bolsters and forming fulcrums for the said body sections, and adjustable controlling connections engaging the inner portions of the body sections to control their dumping movement and arranged to normally hold the same in horizontal position as described.

3. In a dumping body, a pair of parallel lengthwise body sections, a pair of lengthwise rotatable control shafts flexibly connected to the inner adjacent portions of the said body sections, ratchet means normally controlling movement of said control shafts, and hand actuating gearing adjustable to independently and simultaneously engage the said control shafts in operative relation.

4. In a dumping body, a pair of sidewise abutting body sections each of which is movable outwardly and downwardly to dumping position, a pair of lengthwise control shafts, each of which is flexibly connected to one of said body sections, gears carried by the said shafts in detached and offset relation, a lengthwise adjustable actuating shaft having a hand wheel and provided with gears movable with said shaft into independently and simultaneously engaged relation with said control shaft gears, and means to normally prevent movement of said control shafts in one direction.

5. In a dumping wagon, a pair of lengthwise parallel body sections swingable outwardly and downwardly away from one another to dumping position, means forming pivots on which the said sections are swingable, parallel shafts beneath the inner portions of the said sections having flexible connections leading to the sections and adapted to wind upon the shafts, gears secured on the rear portions of the said shafts in offset relation, a control shaft lengthwise shiftable between the rear portions of said winding shafts and having a hand wheel, and a gear secured on the control shaft and shiftable therewith to simultaneously and independently engage the gears of the winding shafts.

CHARLES ABERCROMBIE HOLT, Jr.